United States Patent
Hu et al.

(10) Patent No.: US 10,169,281 B2
(45) Date of Patent: Jan. 1, 2019

(54) SWITCH SYSTEM AND OPERATION METHOD THEREOF

(71) Applicants: Inventec (Pudong) Technology Corporation, Shanghai (CN); INVENTEC CORPORATION, Taipei (TW)

(72) Inventors: Hsiang-Chun Hu, Taipei (TW); Chuang-Chun Chiu, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 19 days.

(21) Appl. No.: 15/468,129

(22) Filed: Mar. 24, 2017

(65) Prior Publication Data
US 2018/0143928 A1    May 24, 2018

(30) Foreign Application Priority Data
Nov. 24, 2016  (CN) .............................. 2016 1 050240

(51) Int. Cl.
*G06F 15/78*  (2006.01)
*G06F 13/40*  (2006.01)
*G06F 9/4401*  (2018.01)
*G06F 13/42*  (2006.01)

(52) U.S. Cl.
CPC ........ *G06F 13/4022* (2013.01); *G06F 9/4406* (2013.01); *G06F 13/4282* (2013.01); *G06F 2213/0026* (2013.01)

(58) Field of Classification Search
CPC .................................................. G06F 15/7871
See application file for complete search history.

(56) References Cited

U.S. PATENT DOCUMENTS

| | | | | |
|---|---|---|---|---|
| 4,370,629 A | * | 1/1983 | Martin | H03J 5/0218 331/177 V |
| 7,265,578 B1 | * | 9/2007 | Tang | G01R 31/318516 326/40 |
| 7,492,765 B2 | * | 2/2009 | Edsall | H04L 49/357 370/389 |
| 2005/0060469 A1 | * | 3/2005 | Feng | G11C 5/066 710/305 |
| 2010/0106951 A1 | * | 4/2010 | Lu | G06F 15/177 713/1 |
| 2014/0101653 A1 | * | 4/2014 | Dharmadhikari | G06F 8/65 717/173 |
| 2017/0344508 A1 | * | 11/2017 | Setiawan | G06F 13/4282 |

* cited by examiner

*Primary Examiner* — Farley Abad
(74) *Attorney, Agent, or Firm* — CKC & Partners Co., Ltd.

(57) ABSTRACT

A switch system is provided. The switch system comprises a first multiplexer and a baseboard management controller (BMC). The first multiplexer is coupled to a first electrically-erasable programmable read-only memory (EEPORM). The baseboard management controller transmits a first control signal to the first multiplexer by a first multiplexer control channel. Wherein, the first control signal controls the first multiplexer coupling to a first serial peripheral interface (SPI) bus. The baseboard management controller transmits a first system parameter to the first multiplexer by the fist SPI bus. The first multiplexer writes the first system parameter by a second serial peripheral interface bus to the first electrically-erasable programmable read-only memory.

16 Claims, 4 Drawing Sheets

SWITCH SYSTEM AND OPERATION METHOD THEREOF

CROSS-REFERENCE TO RELATED APPLICATION

This application claims priority to Chinese Application Serial Number 201611050240.8, filed Nov. 24, 2016, which is herein incorporated by reference.

BACKGROUND

Field of Invention

The present invention relates to a switch system and an operation method thereof. More particularly, the present invention relates to a switch system and an operation method thereof applying a multiplexer.

Description of Related Art

In general, the traditional switch system needs to wait until entering the operation system during the booting procedure for obtaining the related information from the interface of the operation system and transmitting the related information to the corresponded switch through the peripheral component interconnect express (PCIe) bus. Finally, the traditional switch system needs to be rebooted for applying all the related configurations.

However, the traditional switch system needs to write information to the electrically-erasable programmable read-only memory (EEPROM) through the PCIe bus and spend waiting time for finishing the rebooting procedure. After performing the rebooting procedure, the operation system needs to be loaded again. As such, the user needs to spend more waiting time for loading the operation system. Besides, it will cause the PCIe bus to have the lower communication ability when the signal transmitted by PCIe bus gets weaker. Therefore, the complete information may not be fully written to the electrically-erasable programmable read-only memory. Therefore, how to provide an effective switch system for finishing setting all the configurations before finishing the booting procedure and reducing time for performing the rebooting procedure becomes a problem to be solved.

SUMMARY

The invention provides a switch system. A switch system comprises a first multiplexer control channel, a first electrically-erasable programmable read-only memory, a first serial peripheral interface bus, a second serial peripheral interface bus, a first multiplexer and a baseboard management controller. The first multiplexer is coupled to the first electrically-erasable programmable read-only memory. And, the first multiplexer is selectively and electronically coupled to the first serial peripheral interface bus. The baseboard management controller is electronically coupled to the first multiplexer control channel and the first multiplexer, configured to transmit a first control signal to the first multiplexer through the first multiplexer control channel. The first control signal is configured to control the first multiplexer to electronically couple with the first electrically-erasable programmable read-only memory, and the baseboard management controller transmits a first system parameter to the first multiplexer through the first serial peripheral interface bus. The first multiplexer writes the first system parameter to the first electrically-erasable programmable read-only memory through the second serial peripheral interface bus.

On another aspect, the invention provides an operation method for a switch system. The operation method comprises: transmitting a first control signal to a first multiplexer through a first multiplexer control channel by a baseboard management controller, transmitting a first system parameter to the first multiplexer through the first serial peripheral interface bus by the baseboard management controller; and writing the first system parameter to the first electrically-erasable programmable read-only memory through the second serial peripheral interface bus by the first multiplexer. The first control signal is configured to control the first multiplexer to electronically couple with a first electrically-erasable programmable read-only memory.

As mentioned above, through the switch system and the operation method thereof apply the characteristic that the baseboard management controller gets ready very rapidly while the switch system is turned on, the baseboard management controller can write the system parameter to the corresponded switch through the transmission path provided by multiplexer, even the switch is not completely turned on. Therefore, the switch system can finish setting the related configurations of each switch before finishing the booting procedure. The invention no longer needs to load the operation system by multiple times to finish the configurations. As such, the invention achieves the effect of reducing the time of booting procedure. Besides, the baseboard management controller can adjust the signal strength for transmitting data or the adopted bandwidth interface for different demand of the transmission path. Thus, the invention provides the optimized transmission method for transmitting signal.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
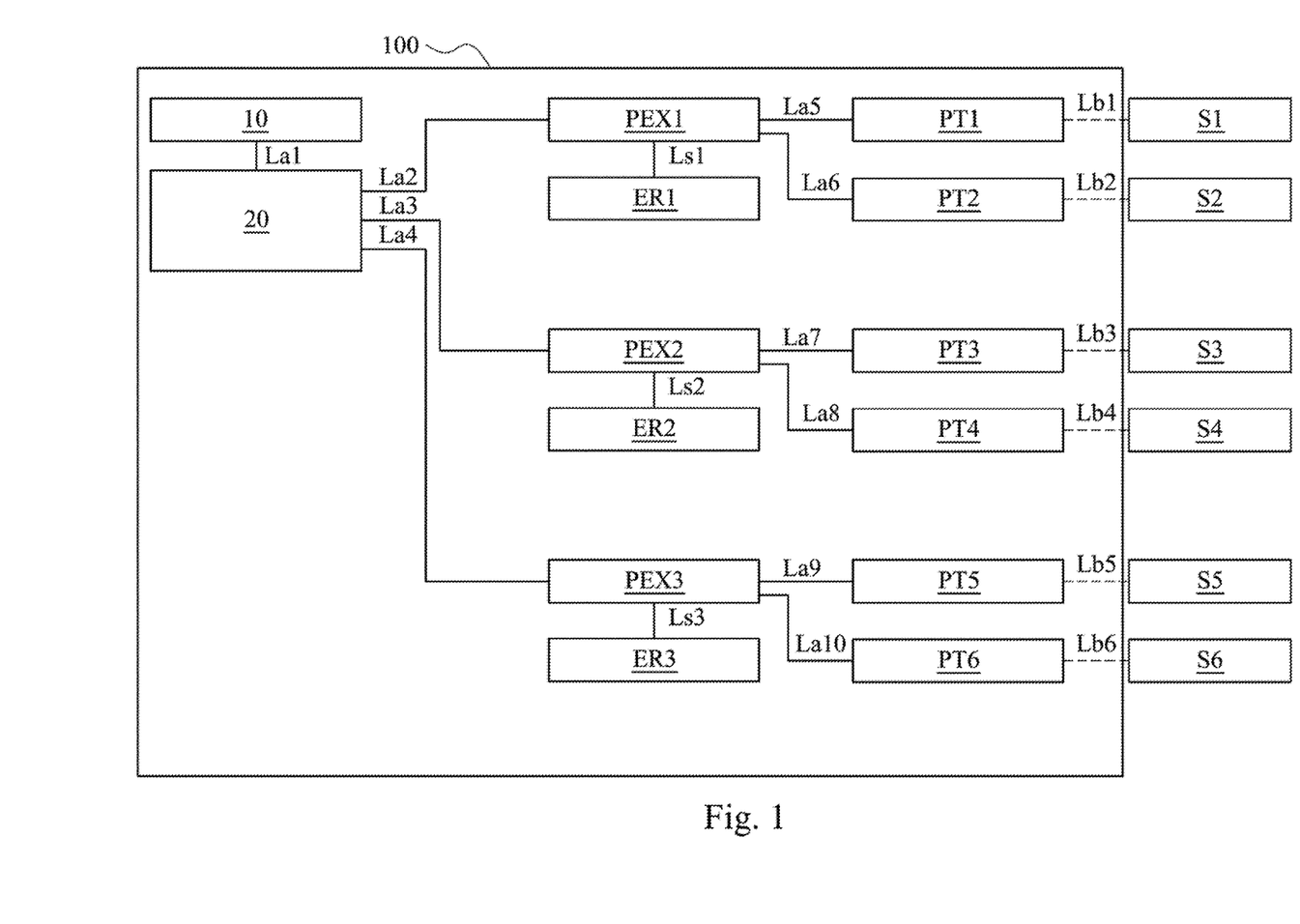
FIG. 1 illustrates a block diagram of a switch system according to an embodiment of the present invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments. Reference is made to FIG. 1. FIG. 1 illustrates a block diagram of a switch system 100 according to an embodiment of the present invention.

In one embodiment, the switch system 100 includes a processing unit 10, a peripheral component interconnect express switch (PCIe switch) 20, multiple switches PEX1-

PEX3, multiple electrically-erasable programmable read-only memories (EEPROMs) ER1-ER3 and connection ports PT1-PT6. In one embodiment, the processing unit 10 uses for calculating different kinds of calculations. The processing unit 10 can be implemented by an integrated circuit, such as a microcontroller, a microprocessor, a digital signal processor, an application specific integrated circuit (ASIC), or a logic circuit. In one embodiment, the peripheral component interconnect express switch 20 can be a switch including PCIe interface. In one embodiment, the switches PEX1-PEX3 can be, for example, the switch type name of PEX 9797 produced by the PLX technology company.

In one embodiment, as shown in FIG. 1, the processing unit 10 is coupled to the peripheral component interconnect express switch 20 by peripheral component interconnect express (PCIe) bus La1. The peripheral component interconnect express switch 20 is coupled to the switches PEX1, PEX2 and PEX3 by PCIe buses La2, La3 and La4, respectively. The switches PEX1, PEX2, PEX3 are respectively coupled to the electrically-erasable programmable read-only memories ER1, ER2 and ER3 by the serial peripheral interface (SPI) buses Ls1, Ls2 and Ls3. The switch PEX1 is coupled to the connection ports PT1 and PT2 by PCIe buses La5 and La6, respectively. The switch PEX2 is coupled to the connection ports PT3 and PT4 by PCIe buses La7 and La8, respectively. The switches PEX3 is coupled to the connection ports PT5 and PT6 by PCIe buses La9 and La10, respectively. In one embodiment, the connection ports PT1-PT6 are respectively coupled to the external servers (or other devices) S1-S6 by wireless (or wire) communication links Lb1-Lb6.

Figure 2:
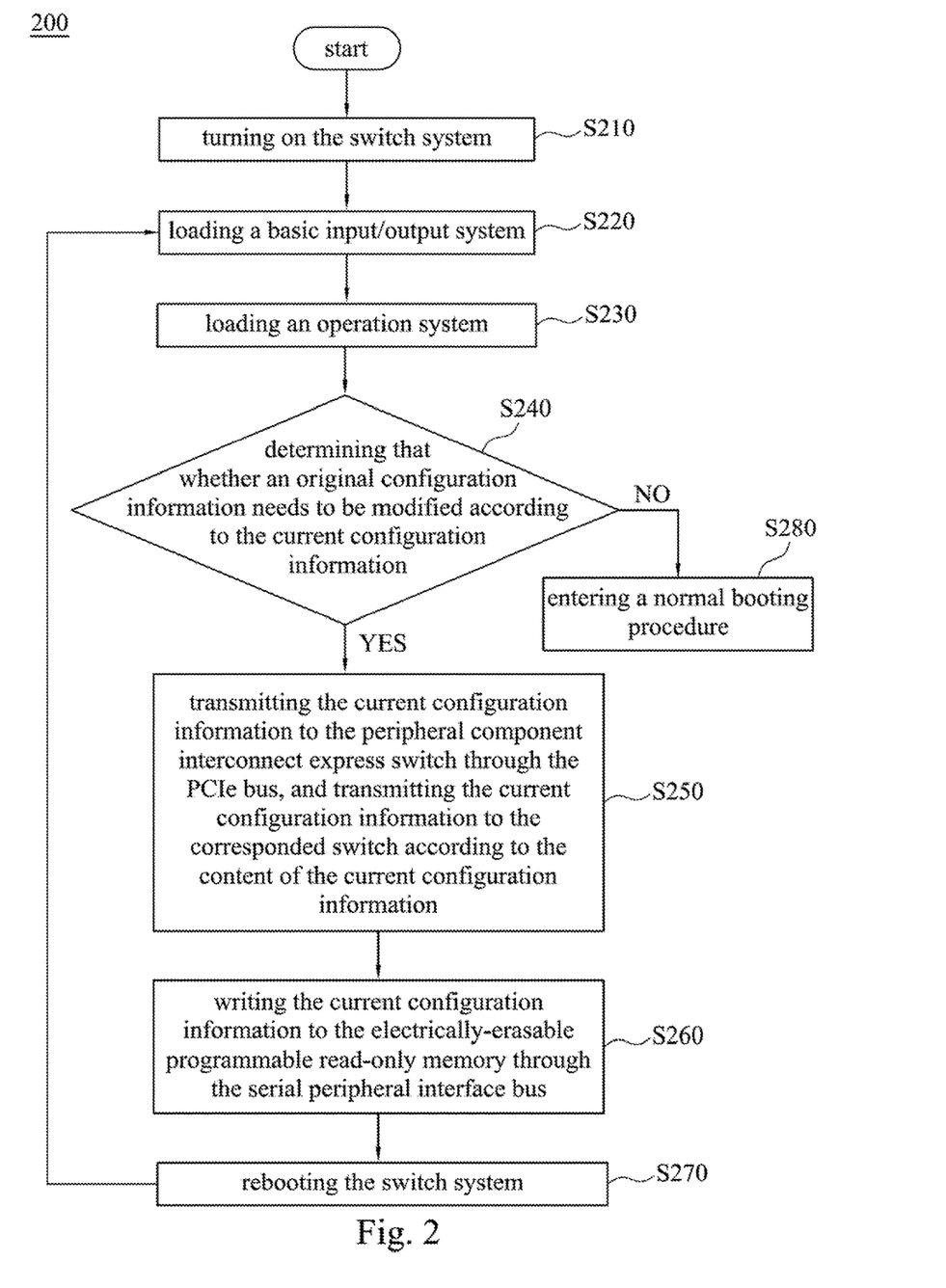
FIG. 2 illustrates a flow chart of an operation method of the switch system 100 according to an embodiment of the present invention.

Reference is made to FIG. 2. FIG. 2 illustrates a flow chart of an operation method 200 of the switch system 100 according to an embodiment of the present invention. The components described in FIG. 2 can be implemented by the components of the switch system 100 mentioned in FIG. 1.

In step S210, the switch system 100 is turned on after triggering a power supply button on a mother board. In one embodiment, a user can push a power supply button of the switch system 100 to turn on the switch system 100. In another embodiment, a user can push a power supply button on a case of an external server to turn on the switch system 100. And, the external server is electronically coupled to the switch system 100.

In step S220, the switch system 100 loads a basic input/output system (BIOS) to perform the booting procedure. In one embodiment, the switch system 100 loads a basic input/output system to perform the booting procedure after the power supply button of the switch system 100 is pushed.

In step S230, the switch system 100 loads an operation system. After loading the operation system, the switches PEX1-PEX3 respectively transmit the current configuration information of itself to the peripheral component interconnect express switch 20 through the PCIe buses La2-La4. The peripheral component interconnect express switch 20 transmits the current configuration information to the processing unit 10.

In one embodiment, the current configuration information includes the system parameters added or modified by user during the booting procedure. In one embodiment, the current configuration information includes each port position of the switches PEX1-PEX3, a current connection port configuration, a pin-strap information, or an information of interface card connecting to the external server or terminal server, etc.

In step S240, the processing unit 10 determines that whether an original configuration information needs to be modified according to the current configuration information. If the processing unit 10 determines that the original configuration information needs to be modified according to the current configuration information, the step S250 is performed. If the processing unit 10 determines that the original configuration information does not need to be modified according to the current configuration information, the step S280 is performed to enter a normal booting procedure.

In one embodiment, the processing unit 10 determines that the original configuration information needs to be modified when at least one of the current configuration information from each switch PEX1-PEX3 is not consistent with the original configuration information of the switch system 100.

In another embodiment, the original configuration information can be the configuration information stored in the electrically-erasable programmable read-only memory when producing the switch system 100. On another hand, user can generate the current configuration information by adjusting the parameter or adding the configuration method after the switch system 100 enters the operation system. The current configuration information can include the definitions that the connection ports PT1-PT3 are respectively coupled to the external servers S1-S3 of the host servers, and the connection ports PT4-PT6 are respectively coupled to the external servers S4-S6 of the end servers.

The processing unit 10 determines using the current configuration information to configure the switch system 100 when the processing unit 10 is notified that the switch system 100 receives the current configuration information. As such, the step S250 is performed.

In step S250, the processing unit 10 transmits the current configuration information to the peripheral component interconnect express switch 20 through the PCIe bus La1. The peripheral component interconnect express switch 20 transmits the current configuration information to the corresponded switch (e.g., switch PEX 1) according to the content of the current configuration information.

In one embodiment, the current configuration information is transmitted by the processing unit 10 through the PCIe bus La1. And, the current configuration information includes the switch position or switch number corresponding to the current configuration information. The peripheral component interconnect express switch 20 can immediately transmit the current configuration information to the switch (e.g., switch PEX 1) through the PCIe bus (e.g., the PCIe bus La2) corresponded to the switch position or switch number.

In step S260, the switch (e.g., switch PEX 1) writes the current configuration information to the electrically-erasable programmable read-only memory (e.g., electrically-erasable programmable read-only memory ER1) through the serial peripheral interface bus (e.g., serial peripheral interface bus Ls1).

Thus, the processing unit 10 can modify the content stored in the electrically-erasable programmable read-only memories ER1, ER2 and ER3 through the communications between the processing unit 10 and the switches PEX1-PEX3.

In step S270, the switch system 100 is rebooted. The switch system 100 performed the steps S220-S230 sequentially to enter the operation system again. And, the switch system 100 is started up and configured according to the current configuration information stored in the electrically-erasable programmable read-only memory (e.g., electrically-erasable programmable read-only memory ER1).

Based on above, during the booting procedure of the switch system 100, the processing unit 10 needs to enter the operation system and then obtains the current configuration information through the interface of the operation system. And, the processing unit 10 transmits the current configuration information to the corresponded switch (e.g., switch PEX1) through the PCIe bus (e.g., PCIe bus La2). Then, this corresponded switch writes the current configuration information to the electrically-erasable programmable read-only memory (e.g., electrically-erasable programmable read-only memory ER1) through the serial peripheral interface bus (e.g., serial peripheral interface bus Ls1). Finally, the switch system 100 is rebooted and then enters to the operation system again. In this way, the processing unit 10 can obtain the current configuration information from the electrically-erasable programmable read-only memory ER1 and apply the current configuration information to each device of the switch system 100.

However, in above example, the switch system 100 needs to spend time for performing the rebooting procedure (step S270) after the information writes to the electrically-erasable programmable read-only memory ER1 through the serial peripheral interface bus Ls1 (step S260). After rebooting procedure, the switch system 100 needs to load the basic input/output system and operation system again (step S220-S230) to reconfigure the system. In other words, the operation method 200 loads the operation system at last twice for applying all the current configuration information. Thus, the user needs to spend much waiting time for performing these procedures. Besides, it will cause the PCIe bus La2 to have the lower communication ability when the signal transmitted by PCIe bus La2 gets weaker. Therefore, the complete information may not be fully written to the electrically-erasable programmable read-only memory ER1.

Figure 3:
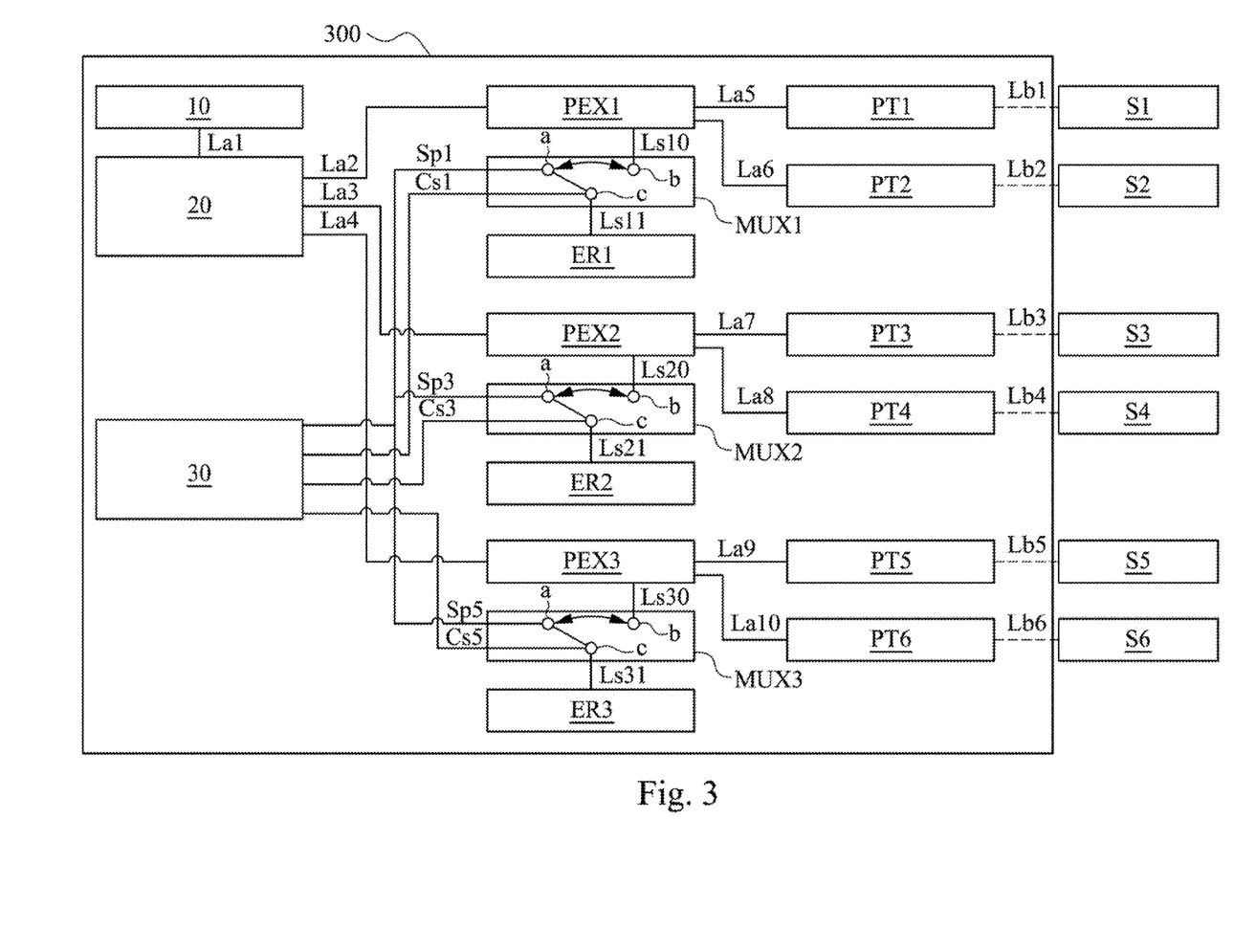
FIG. 3 illustrates a flow chart of a switch system according to an embodiment of the present invention.
Figure 4:
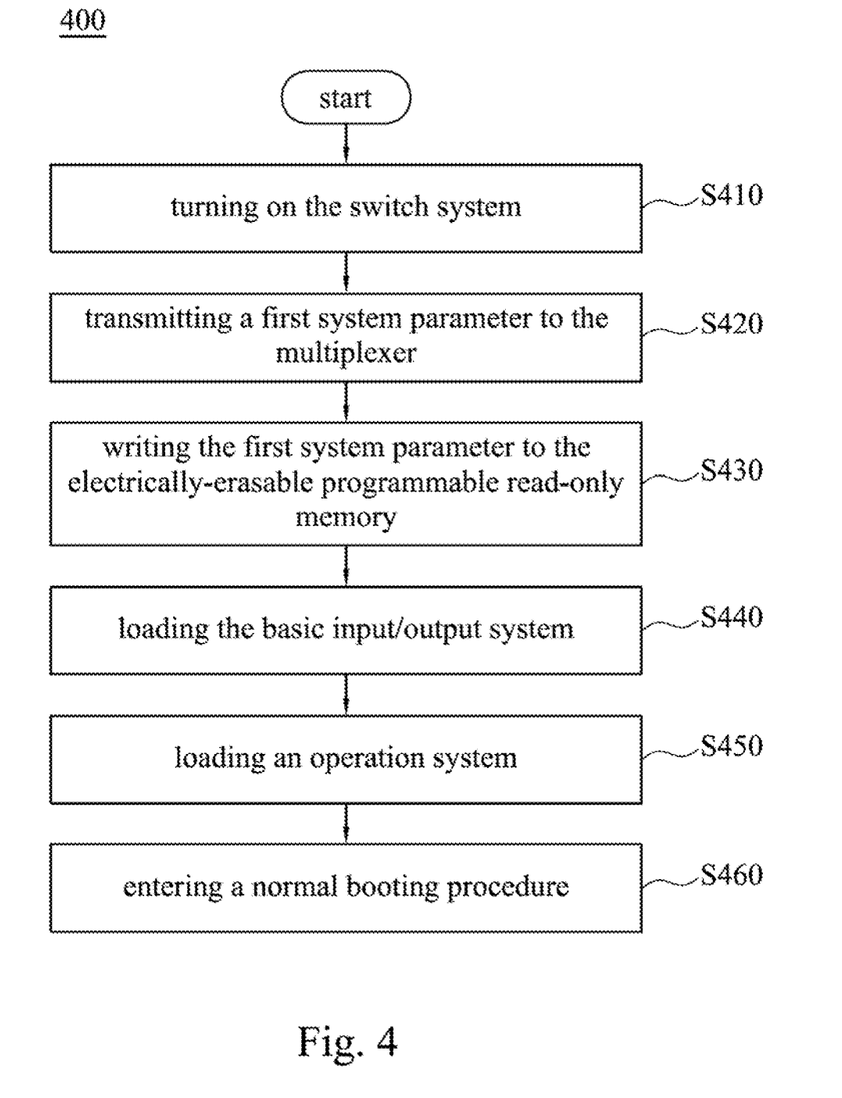
FIG. 4 illustrates a flow chart of an operation method of the switch system according to an embodiment of the present invention.

Therefore, a switch system 300 and an operation method 400 of the switch system 300 can effectively finish the related configurations before finishing the booting procedure are provided below. Also, the switch system 300 and the operation method 400 of the switch system 300 can reduce the waiting time for the rebooting procedure.

Reference is made to FIG. 3. FIG. 3 illustrates a flow chart of a switch system 300 according to an embodiment of the present invention. The difference between the switch system 300 in FIG. 3 and the switch system 100 in FIG. 1 is that the switch system 300 in FIG. 3 further comprises the baseboard management controller (BMC) 30 and multiplexer MUX1.

In one embodiment, the switch system 300 in FIG. 3 can further comprise multiple multiplexers MUX1-MUX3. In one embodiment, the multiplexer MUX2 is coupled to the switch PEX2 and electrically-erasable programmable read-only memory ER2. The multiplexer MUX3 is coupled to the switch PEX3 and electrically-erasable programmable read-only memory ER3.

In one embodiment, the multiplexer MUX1 is coupled to the switch PEX1 through the serial peripheral interface bus Ls10. The multiplexer MUX2 is coupled to the switch PEX2 through the serial peripheral interface bus Ls20. The multiplexer MUX3 is coupled to the switch PEX3 through the serial peripheral interface bus Ls30.

In one embodiment, the switch system 300 further comprises processing unit 10, peripheral component interconnect express switch 20, switches PEX1-PEX3 and external servers S1-S6. The connection method and the operation method of these components are similar to the components in FIG. 1. Therefore, there is no further description herein.

In one embodiment, the multiplexer MUX1 is coupled to the electrically-erasable programmable read-only memory ER1 through the serial peripheral interface bus Ls1. The baseboard management controller 30 uses for transmitting the control signal Cs1 to the multiplexer MUX1 through the multiplexer control channel. In this example, the control signal Cs1 is configured to control the multiplexer MUX1 to electronically couple with the serial peripheral interface bus Sp1. For example, the control signal Cs1 can control that the endpoint c of the multiplexer MUX1 coupled to endpoint b switches to couple with endpoint a. As such, the multiplexer MUX1 is electronically coupled to the serial peripheral interface bus Sp1.

Next, the baseboard management controller 30 transmits a first system parameter to the multiplexer MUX1 through serial peripheral interface bus Sp1. The multiplexer MUX1 writes the first system parameter to the electrically-erasable programmable read-only memory ER1 through the serial peripheral interface bus Ls11.

In one embodiment, the multiplexer MUX2 and the multiplexer MUX3 respectively comprise the endpoints a-c. And, the operation method of these endpoints a-c in the multiplexer MUX2 or the multiplexer MUX3 is similar to the operation method of these endpoints a-c in the multiplexer MUX1. Therefore, there is no further description herein.

In one embodiment, the baseboard management controller 30 transmits the control signal Cs3 to the multiplexer MUX2 through a second multiplexer control channel. The control signal Cs3 controls the multiplexer MUX2 switching to electronically couple with the serial peripheral interface bus Sp3. Next, the baseboard management controller 30 transmits a second system parameter to the multiplexer MUX2 through the serial peripheral interface bus Sp3. The multiplexer MUX2 transmits the second system parameter to the electrically-erasable programmable read-only memory ER2 through the serial peripheral interface bus Ls21.

In one embodiment, the baseboard management controller 30 transmits the control signal Cs5 to the multiplexer MUX3 through a third multiplexer control channel. The control signal Cs5 controls the multiplexer MUX3 switching to electronically couple with the serial peripheral interface bus Sp5. Next, the baseboard management controller 30 transmits a second system parameter to the multiplexer MUX3 through the serial peripheral interface bus Sp5. The multiplexer MUX3 transmits the second system parameter to the electrically-erasable programmable read-only memory ER3 through the serial peripheral interface bus Ls31.

Next, the processing unit 10 loads the basic input/output system. The basic input/output system triggers that the switch PEX1 reads the first system parameter stored in the electrically-erasable programmable read-only memory ER1 through the multiplexer MUX1. And, the switch PEX1 configures at least one configuration value according to the first system parameter. In this example, the at least one configuration value can be, for example, the related information of the connection port PT1 when the connection port PT1 connects to an external device.

Reference is made to FIG. 4. FIG. 4 illustrates a flow chart of an operation method 400 of the switch system 300 according to an embodiment of the present invention.

In step S410, the switch system 300 is turned on after triggering a power supply button on a mother board. In one embodiment, a user can push a power supply button of the switch system 300 to turn on the switch system 300. In another embodiment, a user can push a power supply button on a case of an external server to turn on the switch system 300. In this case, the external server is electronically coupled to the switch system 300. In another embodiment, the baseboard management controller 30 is turned on immediately after the switch system 300 is turned on.

In one embodiment, the baseboard management controller 30 is ready for receiving or transmitting data after the switch system 300 is turned on. For example, the baseboard management controller 30 can receive the signals from each device of the switch system 300.

In step S420, the baseboard management controller 30 transmits a first system parameter to the multiplexer MUX1.

To be more specifically, the baseboard management controller 30 can transmit the control signal Cs1 to the multiplexer MUX1 through multiplexer control channel. The control signal Cs1 is configured to control the multiplexer MUX1 to electronically couple with the serial peripheral interface bus Sp1. For example, the control signal Cs1 can control that the endpoint c of the multiplexer MUX1 coupled to endpoint b switches to couple with endpoint a. As such, the baseboard management controller 30 can transmit the first system parameter to the multiplexer MUX1 through the serial peripheral interface bus Sp1.

In one embodiment, the first system parameter includes a port position of the switch PEX1, a connection port configuration, a pin-strap information or an external server information of a connection port. The information of the first system parameter can pre-stored in the storage device of the baseboard management controller 30 or other storage device. In one embodiment, the baseboard management controller 30 can firstly read the default values from electrically-erasable programmable read-only memory ER1 when the switch system 300 is turned on. The baseboard management controller 30 can adjust the default values according to the demand of the user, so as to generate the first system parameter.

In step S430, the multiplexer MUX1 writes the first system parameter to the electrically-erasable programmable read-only memory ER1 through the serial peripheral interface bus Ls11.

As such, the switch system 300 can firstly write the first system parameter to the electrically-erasable programmable read-only memory ER1 in the condition that the switch system 300 is turned on and the operation system is not loaded. In this way, the switch PEX1 can directly read the first system parameter stored in the electrically-erasable programmable read-only memory ER1 for performing the configurations in the following steps (e.g., step S440). Therefore, the switch PEX1 is finished setting all the configurations before finishing all the steps of booting procedure.

In step S440, the processing unit 10 loads the basic input/output system. The basic input/output system triggers that the switch PEX1 configures at least configuration value according to the first system parameter.

To be more specifically, the baseboard management controller 30 can transmit another control signal (e.g., a second control signal) to the multiplexer MUX1 through multiplexer control channel. In this example, another control signal (e.g., a second control signal) controls the multiplexer MUX1 to couple with switch PEX1.

For example, another control signal can control that the endpoint c of the multiplexer MUX1 switches to couple with endpoint b when the endpoint c is coupled with endpoint a. As such, the multiplexer MUX1 switches to electronically couple with the switch PEX1. The switch PEX1 can read the first system parameter from the electrically-erasable programmable read-only memory ER1 through the multiplexer MUX1 and configure the at least one configuration value according to the first system parameter.

Therefore, the setting of related configuration is finished before the processing unit 10 loads the operation system.

In some embodiment, the processing unit 10 is coupled to the inter-integrated circuit switch 40 by the PCIe bus La1. The inter-integrated circuit switch 40 is coupled to the switch PEX1 by the PCIe bus La2. When the baseboard management controller 30 transmits another control signal (e.g., a second control signal) to control the multiplexer MUX1 to electronically couple with the switch PEX1, the switch PEX1 obtains the first system parameter stored in the electrically-erasable programmable read-only memory ER1 through the multiplexer MUX1 and configures at least one configure value according to the first system parameter, or transmits the first system parameter back to the inter-integrated circuit switch 40 through the PCIe bus La2 and the inter-integrated circuit switch 40 transmits the first system parameter back to the processing unit 10.

In step S450, the switch system 300 loads an operation system. For example, the switch system 300 loads the operation system by processing unit 10.

In step S460, the normal booting procedure is entered. For example, the switch system 300 executes the operation system through the processing unit 10.

Besides, the operation methods of multiplexer MUX2 and multiplexer MUX3 is similar to the multiplexer MUX1. Therefore, there is no further description herein.

Based on above, the baseboard management controller 30 is turned on after the switch system 300 is turned on. Then, the baseboard management controller 30 can directly write the system parameter (e.g., first system parameter) to the electrically-erasable programmable read-only memory (e.g., electrically-erasable programmable read-only memory ER1) of the corresponded switch (e.g., switch PEX1) through the multiplexer (e.g., multiplexer MUX1) when the basic input/output system is loaded and the baseboard management controller 30 is ready. Next, the switch PEX1 can read the first system parameter from the electrically-erasable programmable read-only memory ER1 and setting the configuration after the switch PEX1 is ready. After finishing setting the configuration, the processing unit 10 enters the operation system.

In other words, the baseboard management controller 30 gets ready very rapidly while the switch system 300 is turned on. Therefore, the first system parameter can be written to the corresponded electrically-erasable programmable read-only memory ER1 of the corresponded switch PEX1 before the switch PEX1 and/or the processing unit 10 is completely turned on. In this manner, the first system parameter can be read form the electrically-erasable programmable read-only memory ER1 for finishing the configuration of the switch PEX1 rapidly according to the first system parameter when the switch PEX is ready.

Besides, the switch system 300 only needs to load the operation system once. The switch system 300 does not need to waste time for rebooting and loading the operation system again after entering the operation system for writing data to the electrically-erasable programmable read-only memory. In other words, the switch system 300 only needs to load the operation system once and the related configures of each switch can be configured before finishing the booting procedure. Therefore, the switch system 300 can save the time of booting procedure.

It should be noticed that the switch system 300 is not only limited including the switches PEX1-PEX3. The number of the switches can be configured according to the practical application. In one embodiment, the switch system 300 can include nine switches. For example, the switches PEX1-PEX3 can be electronically coupled to the other six switches. And, each one of these six switches is coupled to the multiplexer and the electrically-erasable programmable read-only memory of itself, respectively. The coupling method of these six switches is similar to the switches PEX1-PEX3.

In one embodiment, the baseboard management controller 30 shown in FIG. 3 further uses for analyzing system information. The baseboard management controller 30 transmits a transmission adjustment signal to the multiplexer MUX1 and the multiplexer MUX1 transmits the transmission adjustment signal to the electrically-erasable programmable read-only memory ER1 when the baseboard management controller 30 determines that a transmission rate of the system information is less than a transmission rate threshold. The transmission adjustment signal is transmitted to the switch PEX1 through the multiplexer MUX1 and the switch PEX1 transmits a data according to the transmission adjustment signal when another control signal (e.g., the second control signal) controls that the multiplexer MUX1 switches to electronically couple with the switch PEX1. In this example, the system information can be the related configuration information obtained from the each device of the switch system 300.

In one embodiment, the switch PEX1 can be coupled to other switches. For example, the switch PEX1 can be coupled to the switch PEX3. The switch PEX3 can receive a data from the switch PEX1. On another aspect, the switch PEX3 can be coupled to a slot. The slot comprises multiple connection ports (e.g., connection ports PT5, PT6). And, these connection ports PT5, PT6 are respectively and communicatively coupled to the external servers (e.g. external server S5 and S6). In this example, the external servers S5 and S6 can respectively exchange data through the corresponding connection ports PT5 and PT6 of itself.

In one embodiment, the switch system 300 can comprise multiple slots. The slots can be classified into high speed bandwidth slots and low speed bandwidth slots according to the bandwidth of each slot. In this example, the high speed bandwidth slots and low speed bandwidth slots is defined by the relative bandwidth of the slots.

For example, the connection ports PT1 and PT2 are classified as high speed bandwidth slots and the connection ports PT5 and PT6 are classified as low speed bandwidth slots. And, the connection ports PT1 and PT5 are coupled to a specific external server. When the baseboard management controller 30 determines that a specific data is assigned to transmit to the specific external sever through the switch PEX3 and a transmission rate is less than a transmission rate threshold during the transmission procedure, the baseboard management controller 30 can transmit a transmission adjustment signal to the switch PEX3. The transmission adjustment signal uses for assigning the specific data to be transmitted from the switch PEX3 to the switch PEX1, and the switch PEX1 transmits the specific data to the connection port PT1 through PCIe bus La5. Due to the connection port PT1 is classified as the high speed bandwidth slot, the specific data can be rapidly transmitted to the specific external sever through the communication link Lb1.

In one embodiment, the baseboard management controller 30 further uses for analyzing system information. The baseboard management controller 30 transmits a strength adjustment signal to the multiplexer MUX1 and the multiplexer MUX1 transmits the strength adjustment signal to the electrically-erasable programmable read-only memory ER1 when the baseboard management controller 30 determines that a signal strength rate of the system information is less than a signal strength rate threshold. The strength adjustment signal is transmitted to a switch PEX1 through the multiplexer MUX1 and the switch PEX1 transmits a data according to the strength adjustment signal when another control signal (e.g., the second control signal) controls that the multiplexer MUX1 switches to electronically couple with the switch PEX1. Therefore, the switch PEX1 can increase the signal strength for transmitting the correct data if the signal strength is getting weaker during the transmission procedure.

As mentioned above, through the switch system and the operation method thereof apply the characteristic that the baseboard management controller gets ready very rapidly while the switch system is turned on, the baseboard management controller can write the system parameter to the corresponded switch through the transmission path provided by multiplexer, even when the switch is not completely turned on. Therefore, the switch system can finish setting the related configurations of each switch before finishing the booting procedure. The invention no longer needs to load the operation system by multiple times to finish the configurations. As such, the invention achieves the effect of reducing the time of booting procedure. Besides, the baseboard management controller can adjust the signal strength for transmitting data or the adopted bandwidth interface for different demand of the transmission path. Thus, the invention provides the optimized transmission method for transmitting signal.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A switch system, comprising:
a first multiplexer control channel;
a first electrically-erasable programmable read-only memory;
a first serial peripheral interface bus;
a second serial peripheral interface bus;
a first multiplexer, coupled to the first electrically-erasable programmable read-only memory, and selectively and electronically coupled to the first serial peripheral interface bus;
a baseboard management controller, electronically coupled to the first multiplexer control channel and the first multiplexer, configured to transmit a first control signal to the first multiplexer through the first multiplexer control channel;
a processing unit; and
a first switch;
wherein the first control signal is configured to control the first multiplexer to electronically couple with the first electrically-erasable programmable read-only memory, and the baseboard management controller transmits a first system parameter to the first multiplexer through the first serial peripheral interface bus;
wherein the first multiplexer writes the first system parameter to the first electrically-erasable programmable read-only memory through the second serial peripheral interface bus;

wherein after the first multiplexer writes the first system parameter to the first electrically-erasable programmable read-only memory through the second serial peripheral interface bus, the processing unit loads a basic input/output system and the basic input/output system triggers the first switch to read the first system parameter stored in the first electrically-erasable programmable read-only memory through the first multiplexer, and the first switch configures at least one configuration value according to the first system parameter.

2. The switch system of claim 1, wherein the baseboard management controller is further utilized for transmitting a second control signal to the first multiplexer through the first multiplexer control channel;
wherein the second control signal is configured to control the first multiplexer to electronically couple with the first switch.

3. The switch system of claim 2, wherein the processing unit is coupled to an inter-integrated circuit switch by a first peripheral component Interconnect express bus;
wherein the inter-integrated circuit switch is coupled to the first switch by a second peripheral component Interconnect express bus, and the first switch obtains the first system parameter stored in the first electrically-erasable programmable read-only memory through the first multiplexer when the second control signal controls that the first multiplexer switches to electronically couple with the first switch.

4. The switch system of claim 1, wherein the first system parameter comprises a port position of the first switch, a connection port configuration, a pin-strap information or an external server information of a connection port.

5. The switch system of claim 1, further comprising:
a second switch; and
a second multiplexer, coupled to a second switch and a second electrically-erasable programmable read-only memory;
wherein the baseboard management controller transmits a third control signal to the second multiplexer through a second multiplexer control channel, the third control signal controls the second multiplexer to electronically couple with a third serial peripheral interface bus, the baseboard management controller transmits a second system parameter to the second multiplexer through the third serial peripheral interface bus, and the second multiplexer transmits the second system parameter to the second electrically-erasable programmable read-only memory through a fourth serial peripheral interface bus.

6. The switch system of claim 5, further comprising:
a third switch, configured to receive a data from the first switch; and
a slot, coupled to the third switch and comprised a connection port;
wherein the connection port is utilized for connecting to an external server;
wherein the external server obtains the data through the connection port.

7. The switch system of claim 1, wherein the baseboard management controller is further utilized for analyzing a system information, the baseboard management controller transmits a transmission adjustment signal to the first multiplexer and the first multiplexer transmits the transmission adjustment signal to the first electrically-erasable programmable read-only memory when the baseboard management controller determines that a transmission rate of the system information is less than a transmission rate threshold; and
the transmission adjustment signal is transmitted to the first switch through the first multiplexer and the first switch transmits a data according to the transmission adjustment signal when the second control signal controls that the first multiplexer switches to electronically couple with the first switch.

8. The switch system of claim 1, wherein the baseboard management controller is further utilized for analyzing a system information, the baseboard management controller transmits a strength adjustment signal to the first multiplexer and the first multiplexer transmits the strength adjustment signal to the first electrically-erasable programmable read-only memory when the baseboard management controller determines that a signal strength rate of the system information is less than a signal strength rate threshold; and
the strength adjustment signal is transmitted to the first switch through the first multiplexer and the first switch transmits a data according to the strength adjustment signal when the second control signal controls that the first multiplexer switches to electronically couple with the first switch.

9. An operation method for a switch system, comprising:
transmitting a first control signal to a first multiplexer through a first multiplexer control channel by a baseboard management controller;
wherein the first control signal is configured to control the first multiplexer to electronically couple with a first electrically-erasable programmable read-only memory;
transmitting a first system parameter to the first multiplexer through the first serial peripheral interface bus by the baseboard management controller;
writing the first system parameter to the first electrically-erasable programmable read-only memory through the second serial peripheral interface bus by the first multiplexer;
loading a basic input/output system,
triggering a first switch by the basic input/output system to read the first system parameter stored in the first electrically-erasable programmable read-only memory through the first multiplexer; and
configuring at least one configuration value according to the first system parameter.

10. The operation method of claim 9, further comprising:
transmitting a second control signal to the first multiplexer through the first multiplexer control channel by the baseboard management controller;
wherein the second control signal is configured to control the first multiplexer to electronically couple with the first switch.

11. The operation method of claim 10, further comprising:
obtaining the first system parameter stored in the first electrically-erasable programmable read-only memory through the first multiplexer by the first switch when the second control signal controls that the first multiplexer switches to electronically couple with the first switch.

12. The operation method of claim 9, wherein the first system parameter comprises a port position of the first switch, a connection port configuration, a pin-strap information or an external server information of a connection port.

13. The operation method of claim 9, wherein the baseboard management controller transmits a third control signal to a second multiplexer through a second multiplexer control channel, the third control signal controls the second multiplexer to electronically couple with a third serial peripheral interface bus, the baseboard management controller transmits a second system parameter to the second multiplexer through the third serial peripheral interface bus, and the second multiplexer transmits the second system parameter to a second electrically-erasable programmable read-only memory through a fourth serial peripheral interface bus.

14. The operation method of claim 13, further comprising:
receiving a data from the first switch by a third switch; and
connecting to an external server by a connection port;
wherein the connection port is comprised in a slot, and the external server obtains the data through the connection port.

15. The operation method of claim 9, further comprising:
analyzing a system information by the baseboard management controller;
wherein the baseboard management controller transmits a transmission adjustment signal to the first multiplexer and the first multiplexer transmits the transmission adjustment signal to the first electrically-erasable programmable read-only memory when the baseboard management controller determines that a transmission rate of the system information is less than a transmission rate threshold; and
the transmission adjustment signal is transmitted to the first switch through the first multiplexer and the first switch transmits a data according to the transmission adjustment signal when the second control signal controls that the first multiplexer switches to electronically couple with the first switch.

16. The operation method of claim 9, further comprising:
analyzing a system information by the baseboard management controller; the baseboard management controller transmits a strength adjustment signal to the first multiplexer and the first multiplexer transmits the strength adjustment signal to the first electrically-erasable programmable read-only memory when the baseboard management controller determines that a signal strength rate of the system information is less than a signal strength rate threshold; and
the strength adjustment signal is transmitted to the first switch through the first multiplexer and the first switch transmits a data according to the strength adjustment signal when the second control signal controls that the first multiplexer switches to electronically couple with the first switch.

\* \* \* \* \*